(12) United States Patent
Lundh et al.

(10) Patent No.: US 6,804,214 B1
(45) Date of Patent: Oct. 12, 2004

(54) SYSTEM AND METHOD FOR IMPLEMENTING MULTIPLE CARRIERS IN CELLULAR NETWORKS

(75) Inventors: Peter Lundh, Skarhomen (SE); Rutger Andersson, Kista (SE); Bert Hansson, Sundbyberg (SE); Patrik Karlsson, Alta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/548,523

(22) Filed: Apr. 13, 2000

Related U.S. Application Data
(60) Provisional application No. 60/130,069, filed on Apr. 19, 1999.

(51) Int. Cl.[7] ............................................. H04B 7/216
(52) U.S. Cl. ....................... 370/335; 370/342; 375/140
(58) Field of Search ................................ 370/335, 342; 375/140, 141, 146, 147

(56) References Cited

U.S. PATENT DOCUMENTS

| | | | | |
|---|---|---|---|---|
| 5,164,958 | A | * 11/1992 | Omura | 375/140 |
| 5,341,397 | A | 8/1994 | Gudmundson | 375/1 |
| 5,715,235 | A | * 2/1998 | Sawahashi et al. | 370/206 |
| 5,956,368 | A | * 9/1999 | Jamal et al. | 375/146 |
| 6,101,176 | A | * 8/2000 | Honkasalo et al. | 370/335 |
| 6,192,040 | B1 | * 2/2001 | Jalloul et al. | 370/335 |
| 6,324,171 | B1 | * 11/2001 | Lee et al. | 370/342 |
| 6,339,589 | B1 | * 1/2002 | Uebayashi et al. | 370/329 |
| 6,377,636 | B1 | * 4/2002 | Paulraj et al. | 375/346 |
| 6,389,000 | B1 | * 5/2002 | Jou | 370/342 |
| 6,556,551 | B1 | * 4/2003 | Schwartz | 370/331 |
| 6,574,476 | B1 | * 6/2003 | Williams | 370/341 |

FOREIGN PATENT DOCUMENTS

WO    WO 94/29981    12/1994

OTHER PUBLICATIONS

Nyström, Jamal et al.; *Comparison Of Cell Search Methods For Asynchronous Wideband CDMA Cellular System*; 1998 IEEE, pp. 783–787.
ISR/PCT/SE 00/ 00740; Completed Sep. 25, 2000.

* cited by examiner

*Primary Examiner*—Chau Nguyen
*Assistant Examiner*—Christine Ng

(57) ABSTRACT

A telecommunications system and method is disclosed for efficient and flexible usage of bandwidth within a code division multiple access (CDMA) cell. Multiple carriers can be included within a CDMA cell, in which a different number of carriers can be allocated to downlink transmissions and uplink transmissions. In addition, a mobile station (MS) can allocate downlink bandwidth from different carriers to contribute to a Traffic channel, making it possible to form high user bit-rates, e.g., 4 Mbps. A CDMA cell can contain a Primary carrier with all channel types and at least one Secondary carrier with only dedicated channels and optionally power controlled common channels. The Primary carrier has a primary scrambling code and zero or more secondary scrambling codes associated therewith, while the Secondary carrier has one or more secondary scrambling codes associated therewith.

30 Claims, 4 Drawing Sheets

SYSTEM AND METHOD FOR IMPLEMENTING MULTIPLE CARRIERS IN CELLULAR NETWORKS

This application claims priority under 35 U.S.C. 119(e)(1) of co-pending U.S. Provisional Application No. 60/130,069, filed on Apr. 19, 1999.

BACKGROUND OF THE PRESENT INVENTION

1. Field of the Invention

The present invention relates generally to cellular networks, and specifically to carriers within cellular networks.

2. Background and Objects of the Present Invention

Code Division Multiple Access (CDMA) utilizes a spread spectrum technique, in which channels and communications are transmitted (spread) over a single frequency band with several mobile stations (MSs) simultaneously using the frequency band. For example, a single CDMA carrier within an IS-95 system usually has a frequency band associated with it that is 1.23 MHz wide, and typically supports approximately twenty subscribers simultaneously. As another example, within a Wideband CDMA (WCDMA) system, a single carrier has a 3.84 MHz frequency band associated with it that typically serves a lot more than twenty subscribers simultaneously.

Each signal transmitted on either the uplink (from the MS to the base station) or the downlink (from the base station to the MS) consists of a different pseudorandom binary sequence (hereinafter referred to as a code) that modulates the carrier and spreads the spectrum of the waveform. Thus, each carrier contains a number of different codes that can be allocated to form different user bit rates. Some of the codes are used for Traffic channels, while others are used for control channels.

Both traffic channels and control channels can be mapped on either dedicated channels or common channels, some of which are power controlled and some of which are non-power controlled. The dedicated channels transfer dedicated information to a particular MS. The downlink transmitted power is optimized for each channel, according to the distance between the base station and the MS and the interference experienced by the MS. An example of such a channel is the Dedicated Channel (DCH) in the WCDMA system. Non-power controlled common channels have a fixed downlink power allocated in order to support coverage over a specific area, such as beyond the borders of the cell. Examples of such channels are the Pilot channel of IS-95 systems and the Synchronization Channel (SCH), Broadcast Channel (BCH) and Paging Channel (PCH) or WCDMA systems. Power controlled common channels are shared by many MSs, but the transferred information is dedicated for each MS. Therefore, with power controlled common channels, there can be a separate downlink power control for each MS-connection. An example of such a channel is the Forward Access Channel (FACH) in WCDMA systems.

In every CDMA system, there are a certain number of downlink code channels allocated as control channels. For example, in the IS-95 system, there are 64 potentially available downlink code channels, nine of which are reserved for control information. To increase the number of available Traffic Channels, the IS-95B version of CDMA was introduced. In the IS-95B version, an additional uplink and downlink carrier is added with a reduced set of control channels. A first downlink carrier consists of all of the control channels, and a second carrier consists of only the Pilot channel of the control channels and up to 63 downlink Traffic channels.

However, the additional uplink carrier is symmetrical to the additional downlink carrier (equal air interface bandwidth on both). Thus, even with the addition of a second downlink carrier, the MS is still restricted in that it can only allocate Traffic channel(s) from one of the carriers during a call. In addition, since the Pilot channel has a high downlink transmit power associated with it to support general coverage over a specific area (typically beyond the border of the cell), by keeping the Pilot channel on the second carrier, the transmit power allocated to Pilot channel will force the downlink transmit power allocation of Traffic channels to significantly higher power levels, due to downlink interference. This increases the interference in the cell and increases the size and weight of Multi/Single Carrier Amplifiers used in CDMA cells.

Furthermore, within any type of cellular system, including CDMA and Time Division Multiple Access (TDMA) systems, the carriers for the uplink and downlink directions each contain an equal amount air-interface bandwidth. Thus, the same amount of spectrum is typically used for both directions for a call. Although a user may be able to establish a non-symmetrical connection for certain services defined by the operator, the cellular systems of today do not have the flexibility required to allow an operator to allocate non-symmetrical bandwidth over the air-interface for any call.

For example, many service providers are now offering wireless Internet connections to MSs. However, Internet browsing requires significantly more downlink bandwidth than a normal call. Unfortunately, it is currently not an efficient usage of resources to connect a non-symmetrical bandwidth call (allocate more downlink bandwidth than uplink bandwidth) out of a symmetrical spectrum. If an operator were to do so, a portion of the uplink bandwidth corresponding to additional allocated downlink bandwidth would not be used.

It is, therefore, an object of the invention to provide for multiple carriers within cellular network cells.

It is a further object of the present invention to allow for flexible allocation of bandwidth on multiple carriers within a cell.

It is still a further object of the present invention to utilize a different number of carriers for downlink and uplink bandwidth.

It is still a further object of the present invention to allow downlink bandwidth to be allocated from more than one carrier for a particular mobile station.

It is still a further object of the present invention to provide for a primary carrier containing all types of channels and a secondary carrier containing only dedicated channels and optionally power-controlled common channels.

SUMMARY OF THE INVENTION

The present invention is directed to telecommunications systems and methods for efficient and flexible usage of bandwidth within a code division multiple access (CDMA) cell. Multiple carriers can be included within a CDMA cell, in which a different number of carriers can be allocated to downlink transmissions and uplink transmissions. In addition, a mobile station (MS) can allocate downlink bandwidth from different carriers to contribute to a Traffic channel, making it possible to form high user bit-rates, e.g., 4 Mbps. To reduce the total transmit output power within a cell, on the downlink, the cell can contain a Primary carrier with at least non-power controlled common channels and at least one Secondary carrier with only dedicated channels and optionally power-controlled common channels. The Primary carrier has a primary scrambling code and zero or more secondary scrambling codes for scrambling transmissions over a first CDMA bandwidth, while the Secondary carrier consists of one or more secondary scrambling codes for scrambling transmissions over a second CDMA bandwidth. The primary scrambling code is used to scramble non-power controlled channels as well as power-controlled channels, while the secondary scrambling code is used to scramble only power-controlled channels (common or dedicated).

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
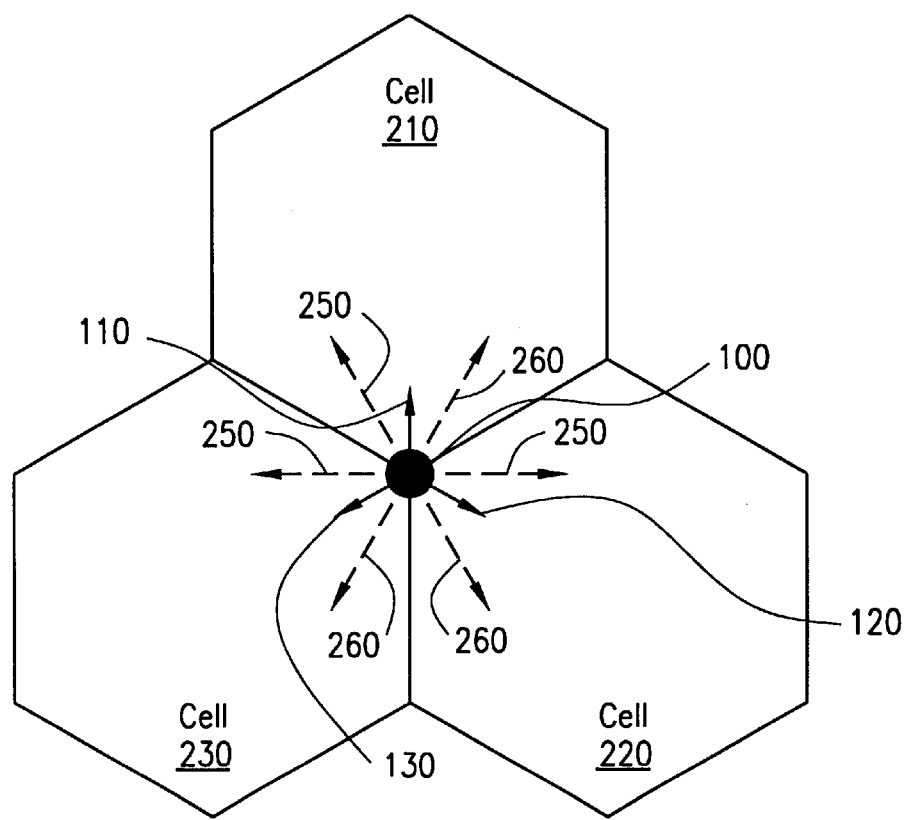
FIG. 1 illustrates a code division multiple access (CDMA) cell structure having at least two carriers on the downlink per cell in accordance with embodiments of the present invention.

With reference now to FIG. 1 of the drawings, a cell structure for a code division multiple access (CDMA) telecommunications system is illustrated in accordance with embodiments of the present invention. A three-sector structure having three cells per site is shown, but it should be understood that any type of structure can be used, such as an omni-directional cell. In the three-sector structure, a base station 100 has three antenna pointing azimuths 110, 120 and 130, in which each antenna pointing azimuth 110, 120 and 130 is directed towards a separate cell 210, 220 and 230, respectively. Depending on whether or not the system operator has implemented a frequency re-use plan, each cell 210, 220 and 230 can utilize the same or different frequency bands for uplink and downlink transmissions.

In order to provide more flexibility in allocation of downlink bandwidth, each cell 210, 220 and 230 is provided with at least three carriers, two of which are shown and designated by reference numbers 250 and 260, each being associated with a different frequency band. One carrier is for the uplink (not shown), one carrier 250 is for the downlink and at least one more carrier 260 is for either the downlink or uplink or both, the former being illustrated. Typically, carriers 250 and 260 are assigned in pairs for the uplink and downlink (termed Frequency Division Duplex mode paired bands). In this case, to allow for flexibility in allocation of downlink bandwidth, each carrier 250 and 260 can be reserved for a different type of use. For example, if two FDD mode pairs are assigned, the operator can use one carrier (not shown) for the uplink, two carriers 250 and 260 for the downlink, as is shown in FIG. 1, and the fourth carrier (not shown) for another use, or for use by another operator. Advantageously, assigning each carrier 250 and 260 individually to a different purpose allows for non-symmetrical allocation of air-interface spectrum for the downlink and uplink.

In addition, from an operation and maintenance perspective, cells with several carriers make it easier for an operator to manage the cells, since high capacity cells could potentially substitute a number of single carrier cells. Thus, the number of neighboring cells is fewer in a multi-carrier cell environment, which can be a CDMA system, a TDMA system or any other comparable system, e.g., GSM.

Figure 2:
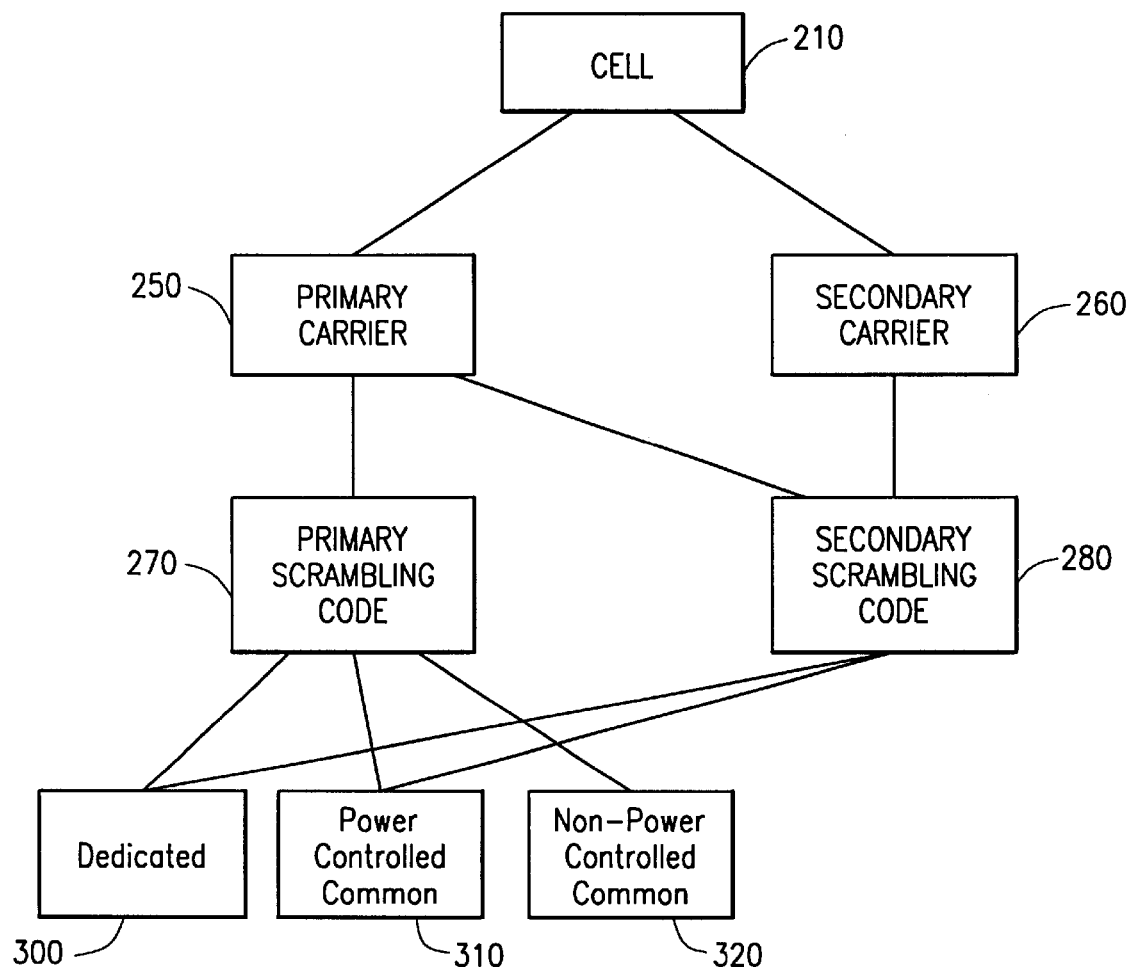
FIG. 2 is a class diagram of cell definition on the downlink for a CDMA cell having a Primary carrier and at least one Secondary carrier.

With references now to FIG. 2 of the drawings, in order for a cell 210 to have more downlink resources than what is possible with only one carrier (one frequency band), a cell 210 can have at least one Primary downlink carrier 250 capable of transmitting all channel types 300–320 and at least one Secondary downlink carrier 260 capable of transmitting only dedicated channels 300 and optionally power controlled common channels 310.

The Primary carrier 250 has a primary scrambling code 270 plus zero or more secondary scrambling codes 280 associated therewith, while the Secondary carrier 260 has one or more secondary scrambling codes 280 associated therewith. The primary scrambling code 270 scrambles all of the channels, such as the dedicated channels 300, power controlled common channels 310 and non-power controlled common channels 330, whereas the secondary scrambling code 280 scrambles only dedicated channels 300 and optionally power controlled common channels 310, as is shown. It should be noted that the main purpose of the secondary scrambling code 280 is to scramble traffic channels, which can be mapped on either dedicated channels 300 or power controlled common channels 310. In addition, it should be noted that the secondary scrambling code 280 in the Primary carrier 250 can be used to increase the number of channels to the carrier if the interference allows for it.

Advantageously, since the Secondary carrier(s) 260 do not have non-power controlled common channels, the system capacity is increased, as only one carrier (Primary carrier 250) with non-power controlled common channels is needed in a cell 210. In addition, from an MS perspective, multi-carrier cells reduce the need for control channel readings, which lowers the MS power consumption.

Figure 3:
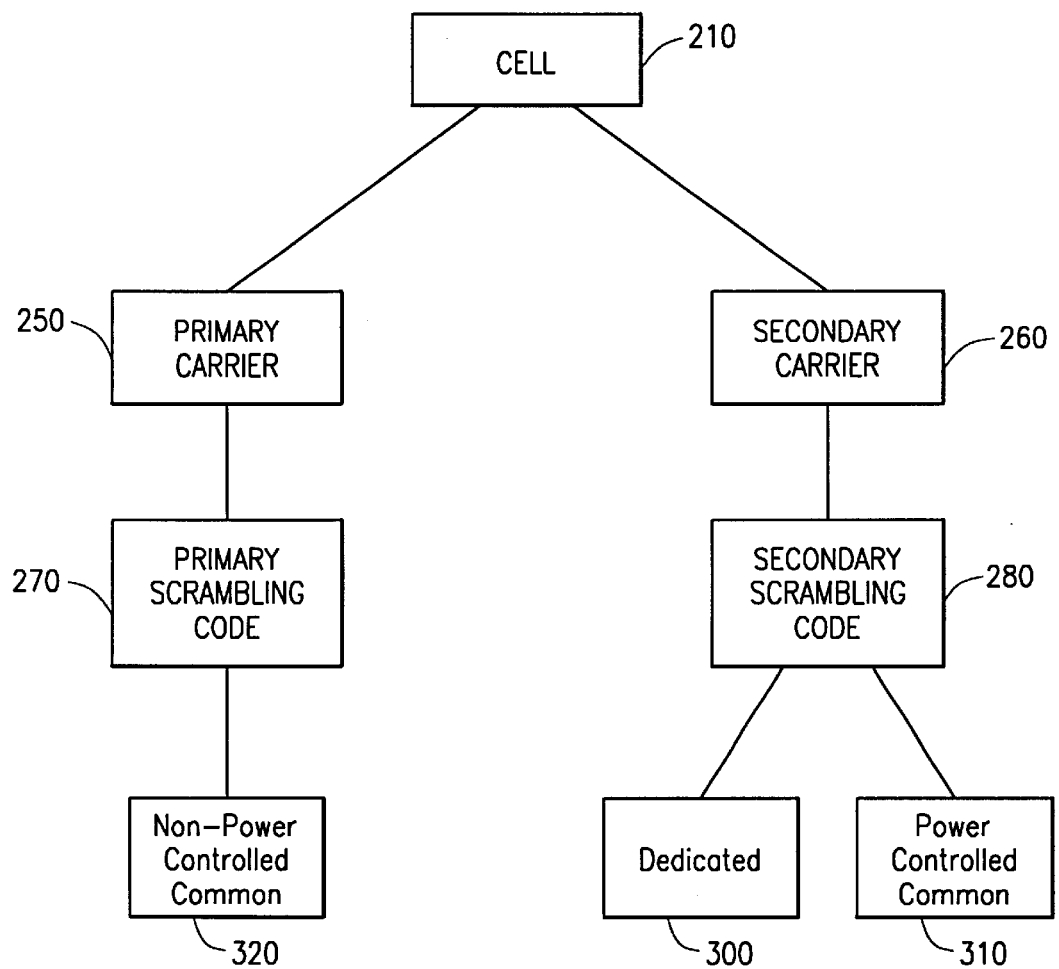
FIG. 3 is a class diagram of an alternative cell definition on the downlink for a CDMA cell having a Primary carrier and at least one Secondary carrier.

With reference now to FIG. 3 of the drawings, a class diagram of an alternative cell definition on the downlink for a CDMA cell having at least one Primary carrier 250 and at least one Secondary carrier 260 is illustrated. As in FIG. 2, the Primary carrier 250 has a primary scrambling code 270 associated with it, while the Secondary carrier 260 has one or more secondary scrambling codes 280 associated with it.

However, in this embodiment, the Primary carrier 250 does not have any secondary scrambling codes 280 associated with it, and the primary scrambling code 270 scrambles all non-power controlled common channels 320, such as the Pilot channel of the IS-95 system and the Synchronization Broadcast Channel and Paging Channel of WCDMA systems. As discussed hereinbefore, the non-power-controlled common channels 320 have a fixed downlink transmitted power to support general coverage over a specific area. In most cases, the transmit power is dimensioned so that a non-power-controlled control signal can be received by MSs beyond the border of the cell 210.

In addition, in this embodiment, the secondary scrambling code 280 is only associated with the Secondary carrier 260 and is responsible for scrambling all of the power-controlled channels, such as dedicated channels 300 and any power controlled common channels 310. It should be understood that the channel estimation and power control for dedicated channels 300 and power-controlled common channels 310 on the Secondary carrier 260 is supported by pilots (not shown) allocated on these channels within the Secondary carrier 260.

Since the non-power controlled common channels 320 typically require a high downlink transmitted power per carrier, the problem with allocating non-power controlled common channels 320 and dedicated channels 300 to the same carrier is that the transmit power allocated to the non-power controlled common channels 320 will force the downlink transmit power allocation of dedicated channels 300 to significantly higher power levels, due to downlink interference. Therefore, when there are two or more carriers (Primary 250 and Secondary 260) allocated to a cell 210 covering the same area, by removing all of the non-power controlled downlink common channels 320 from one of the carriers (Secondary carrier 260), the total downlink transmitted power on the dedicated channels 300 is reduced. In addition, by including the dedicated channels 300 on only the Secondary carrier 260 with optionally the power controlled downlink common channels 310, the total transmit output power within the cell 210 as a whole is reduced. Also, by optionally dividing the power controlled 310 and non-power controlled common channels 320 into two separate carriers 260 and 250, respectively, an example of which is shown in FIG. 3, the downlink interference is generally reduced in a cell 210, which is essential for CDMA capacity.

Further options not illustrated include having both power controlled common channels 310 and non-power controlled common channels 320 on the Primary carrier 250, and having both power controlled common channels 310 and dedicated channels 300 or only dedicated channels 300 on the Secondary carrier 260.

Furthermore, due to the reduction in transmit downlink power, the power consumption of Multi/Single Carrier Amplifiers (MCPA/SCPA), used for CDMA/WCDMA systems decreases significantly, which in turn, reduces the size and weight of the amplifiers. Since these amplifiers make up a large part of a base station, this leads to a reduction in the size and weight of the base station for CDMA/WCDMA systems.

As a further alternative to FIG. 3, since only non-power controlled common channels 320 are included on the Primary carrier 250, a narrow bandwidth can be allocated for the Primary carrier 250 and a wider bandwidth can be allocated to the Secondary carrier(s) 260. The Primary carrier 250, supporting non-power controlled common channels for CDMA/WCDMA could even be located in the frequency band of another cellular system, e.g., GSM frequency band.

The above-described solution can also be applied to cell planning techniques. For example, the Primary carrier 250 (with non-power controlled common channels 320) for each cell 210 can be assigned to the same frequency within the base station (for three-sector cell structures) and/or within the entire network. Likewise, the Secondary carrier(s) 260 for each cell 210 could also be assigned the same respective frequency within the base station and/or within the entire network.

Figure 4A:
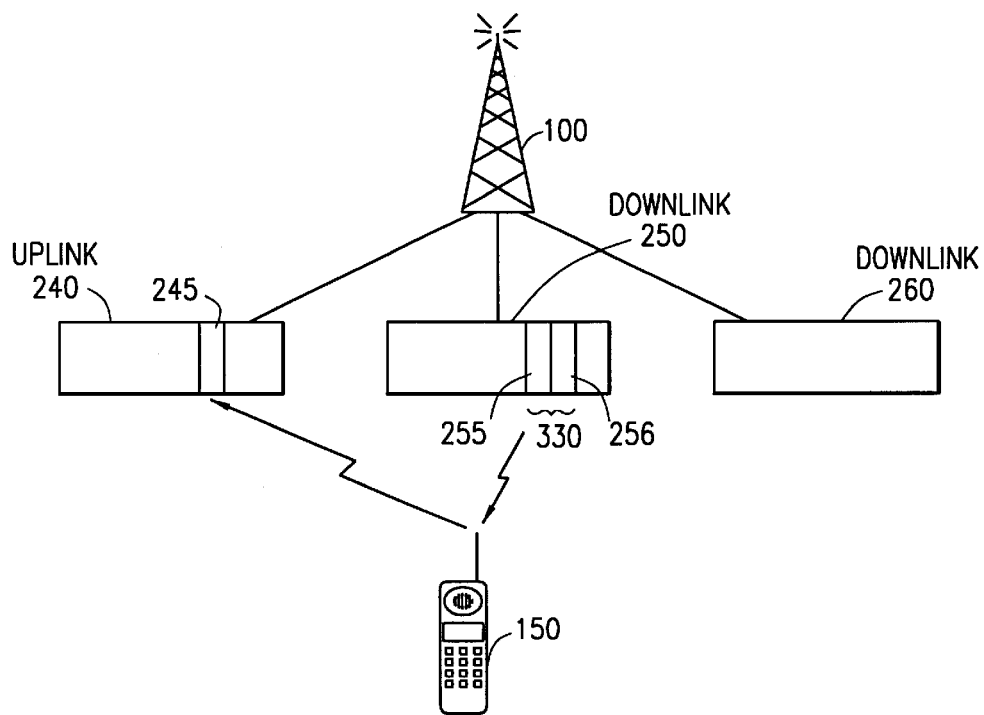
FIGS. 4A and 4B illustrate the non-symmetrical allocation of downlink bandwidth to a mobile station within a CDMA cell.
Figure 4B:
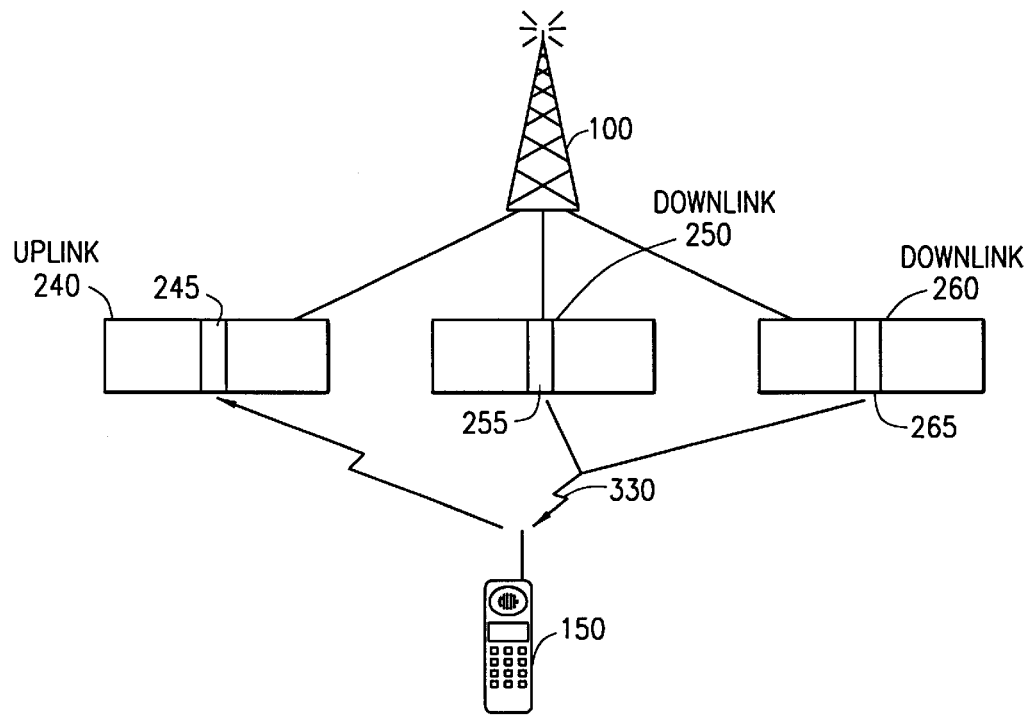

In addition, with reference now to FIGS. 4A and 4B, the cell concept described in FIG. 2 or FIG. 3 can be defined in such a way that the MS 150 can allocate non-symmetrical downlink bandwidth as compared to uplink bandwidth for a call. As shown in FIG. 4A, the MS 150 can establish a high bit-rate connection, e.g., 4 Mbps, by adding resources in the cell 210 among available channels within one of the downlink carriers. For example, an up-link channel 245 within an uplink carrier 240 can be assigned to the MS 150 by the base station 100, as usual. If the MS 150 requires additional downlink bandwidth, the MS 150 can request non-symmetrical downlink bandwidth. Since there are two available downlink carriers (Primary 250 and Secondary 260), the base station 100 can assign multiple channels 255 and 256 from one of the carriers (here the Primary carrier 250) to the MS 150 to make up a downlink traffic channel 330 for the call. As is understood, in order to distinguish between the assigned channels 255 and 256 that make up the downlink traffic channel 330, the different assigned channels 255 and 256 can use different scrambling codes within the carrier (i.e. primary scrambling code 270 and zero or more secondary scrambling codes 280).

Alternatively, as shown in FIG. 4B, the MS 150 can allocate resources from different downlink carriers 250 and 260 belonging to the same cell 210 to contribute to a single traffic channel 330. For example, the base station 100 can assign one or more channels 255 from the Primary carrier 250 using the primary scrambling code 270 and/or one or more secondary scrambling codes 280, and one or more channels 265 from the Secondary carrier 260 using one or more secondary scrambling codes 280 to the MS 150 to make up the traffic channel 330. Therefore, embodiments of the present invention allow for a multi-carrier radio-link connection in a cell 210 to the MS 150.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A cell within a code division multiple access telecommunications system, comprising:

at least one primary downlink carrier having a primary scrambling code associated therewith, said primary scrambling code being configured to scramble at least non-power controlled common channels for transmission over a first downlink bandwidth, wherein said primary downlink carrier has said primary scrambling code and at least one secondary scrambling code associated therewith; and at least one secondary downlink carrier having only said at least one secondary scrambling code associated therewith said secondary scrambling code being configured to scramble only power-controlled channels for transmission over a second downlink bandwidth, wherein said power-controlled channels include only dedicated channels.

2. The cell of claim 1, wherein said power-controlled channels include dedicated channels and common channels.

3. The cell of claim 1, wherein detection of said power-controlled channels within said at least one secondary downlink carrier are supported by at least one pilot allocated on each of said power-controlled channels.

4. The cell of claim 1, wherein said primary scrambling code is configured to scramble said non-power controlled common channels and said power-controlled channels.

5. The cell of claim 1, further comprising:
a given one of said power controlled channels using at least one secondary scrambling code from either said at least one primary downlink carrier or said at least one secondary downlink carrier.

6. The cell of claim 1, further comprising:
a given one of said power controlled channels using at least one secondary scrambling code from said at least one primary downlink carrier and at least one secondary scrambling code from said at least one secondary downlink carrier.

7. The cell of claim 1, further comprising:
a given one of said power controlled channels using at least one secondary scrambling code from either said at least primary downlink carrier or said at least one secondary downlink carrier and at least one primary scrambling code from said at least one primary downlink carrier.

8. The cell of claim 1, further comprising:
at least one uplink carrier configured to transmit information on at least one uplink channel over an uplink bandwidth in the bandwidth, the total combination of said first and second downlink code division multiple access bandwidth being unequal to said uplink code division multiple access bandwidth.

9. The cell of claim 1, wherein said at least one primary carrier includes only said non-power controlled common channels.

10. The cell of claim 9, wherein said first downlink bandwidth is allocated in a frequency band of a first cellular system and said second downlink bandwidth is allocated in a frequency band of a second cellular system.

11. A code division multiple access telecommunications system, comprising:
a base station configured to serve at least one cell, said at least one cell having:
at least one primary downlink carrier having at least a primary scrambling code associated therewith, said primary scrambling code being configured to scramble at least non-power controlled common channels for transmission over a first downlink bandwidth, wherein said primary downlink carrier has said primary scrambling code and at least one secondary scrambling code associated therewith, and
at least one secondary downlink carrier having said at least one secondary scrambling code associated therewith, said at least one secondary scrambling code being configured to scramble only power-controlled channels for transmission over a second downlink bandwidth; and
a mobile station within said cell and in wireless communication with said base station, said mobile station being adapted to receive downlink transmissions from said base station over said first and second downlink bandwidth, wherein said power-controlled channels include only dedicated channels.

12. The telecommunications system of claim 11, wherein said power-controlled channels include dedicated channels and common channels.

13. The telecommunications system of claim 11, wherein detection of said power-controlled channels within said at least one secondary downlink carrier are supported by at least one pilot allocated on each of said power-controlled channels.

14. The telecommunications system of claim 11, wherein said primary scrambling code is configured to scramble said non-power controlled common channels and said power-controlled channels.

15. The telecommunications system of claim 11, wherein said base station is configured to allocate a given one of said power-controlled channels to said mobile station, said given power-controlled channel using at least one secondary scrambling code from either said at least one primary downlink carrier or said at least one secondary downlink carrier.

16. The telecommunications system of claim 11, wherein said base station is configured to allocate a given one of said power-controlled channels to said mobile station, said given power-controlled channel using at least one secondary scrambling code from said at least one primary downlink carrier and at least one secondary scrambling code from said at least one secondary downlink carrier.

17. The telecommunications system of claim 11, wherein said base station is configured to allocate a given one of said power-controlled channels to said mobile station, said given power-controlled channel using at least one secondary scrambling code from either said at least one primary downlink carrier or said at least one secondary downlink carrier and at least one primary scrambling code from said at least one primary downlink carrier.

18. The telecommunications system of claim 11, wherein said cell further comprises at least one uplink carrier configured to transmit information on at least one uplink channel over an uplink bandwidth, the total bandwidth in the combination of said first and second downlink bandwidth being unequal to said uplink bandwidth.

19. The telecommunications system of claim 11, wherein said at least one primary carrier includes only said non-power controlled common channels.

20. The telecommunications system of claim 19, wherein said first downlink bandwidth is allocated in a frequency band of a first cellular network and said second downlink bandwidth is allocated in a frequency band of a second cellular network.

21. The telecommunications system of claim 11, further comprising:
at least one additional cell served by said base station, said at least one additional cell having said at least one primary carrier configured to transmit at least said non-power controlled common channels over said first downlink code division multiple access bandwidth and said at least one secondary carrier configured to transmit only said power-controlled channels over said second downlink code division multiple access bandwidth.

22. The telecommunications system of claim 21, wherein said at least one primary carrier within both said cell and said additional cell are allocated to the same frequency.

23. The telecommunications system of claim 11, further comprising:
at least one additional base station configured to serve at least one additional cell, said at least one additional cell having said at least one primary carrier configured to transmit at least said non-power controlled common channels over said first downlink code division multiple access bandwidth and said at least one secondary carrier configured to transmit only said power-controlled channels over said second downlink code division multiple access bandwidth.

24. The telecommunications system of claim 23, wherein said at least one primary carrier within both said cell and said additional cell are allocated to the same frequency.

25. A method for implementing multiple carriers within a cell within a code division multiple access telecommunications system, said method comprising the steps of:

providing at least one primary downlink carder having at least a primary scrambling code and at least one secondary scrambling code associated therewith;

scrambling at least non-power controlled common channels for transmission over a first downlink bandwidth using said primary scrambling code;

providing at least one secondary downlink carrier having at said least one secondary scrambling code associated therewith;

scrambling only power-controlled channels for transmission over a second downlink bandwidth using said at least one secondary scrambling code; and scrambling said non-power controlled common channels and said power-controlled channels using said primary scrambling code.

26. The method of claim 25, further comprising the step of:

allocating a given one of said power-controlled channels using said at least one secondary scrambling code from either said at least one primary downlink carrier or said at least one secondary downlink carrier.

27. The method of claim 25, further comprising the step of:

allocating a given one of said power-controlled channels using at least one secondary scrambling code from said at least one primary downlink carrier and at least one secondary scrambling code from said at least one secondary carrier.

28. The method of claim 25, further comprising the step of:

allocating a given one of said power-controlled channels using at least one secondary scrambling code from either said at least one primary downlink carrier or said at least one secondary downlink carrier and at least one primary scrambling code from said primary downlink carrier.

29. The method of claim 25, further comprising the step of:

providing at least one uplink carrier for transmitting information on at least one uplink channel over an uplink bandwidth, the total bandwidth in the combination of said first and second downlink bandwidth being unequal to said uplink bandwidth.

30. The method of claim 25, wherein said step of providing said at least one primary downlink carrier further comprises the step of:

allocating said first downlink bandwidth in a frequency band of a first cellular network, said step of providing said at least one secondary downlink carrier further comprising the step of:

allocating said second downlink bandwidth in a frequency band of a second cellular network.

* * * * *